US010135344B2

(12) United States Patent
Radic et al.

(10) Patent No.: US 10,135,344 B2
(45) Date of Patent: Nov. 20, 2018

(54) LOSSLESS SNUBBER CIRCUITS

(71) Applicant: Silanna Asia Pte Ltd, Singapore (SG)

(72) Inventors: Aleksandar Radic, Toronto (CA); Seyed-Behzad Mahdavikhah-Mehrabad, Toronto (CA)

(73) Assignee: Silanna Asia Pte Ltd, Singapore (SG)

( * ) Notice: Subject to any disclaimer, the term of this patent is extended or adjusted under 35 U.S.C. 154(b) by 0 days.

(21) Appl. No.: 15/209,184

(22) Filed: Jul. 13, 2016

(65) Prior Publication Data

US 2018/0019678 A1 Jan. 18, 2018

(51) Int. Cl.
*H02H 7/122* (2006.01)
*H02M 3/335* (2006.01)
*H02M 1/08* (2006.01)
*H02M 1/34* (2007.01)
*H02M 3/28* (2006.01)
*H02M 1/00* (2006.01)

(52) U.S. Cl.
CPC ......... *H02M 3/33507* (2013.01); *H02M 1/08* (2013.01); *H02M 1/34* (2013.01); *H02M 3/285* (2013.01); *H02M 2001/0074* (2013.01)

(58) Field of Classification Search
CPC .. H02M 3/1588; H02M 7/493; H02M 3/1584; Y02B 70/1491; H02J 1/102; H02J 1/108
USPC ......... 323/271, 272; 363/65, 71, 72
See application file for complete search history.

(56) References Cited

U.S. PATENT DOCUMENTS

| | | | |
|---|---|---|---|
| 5,796,595 A * | 8/1998 | Cross | H02M 3/285 363/131 |
| 6,094,366 A * | 7/2000 | Kalfhaus | H02M 1/4258 363/73 |
| 6,233,165 B1 | 5/2001 | Irissou et al. | |
| 8,836,236 B1 | 9/2014 | Chiang | |
| 9,537,406 B1 * | 1/2017 | Lin | H02M 3/285 |

(Continued)

FOREIGN PATENT DOCUMENTS

WO 2016/101058 6/2016

OTHER PUBLICATIONS

Radic, Aleksandar et al.; High-Power Density Hybrid Converter Topologies for Low-Power Dc-Dc SMPS; The 2014 International Electronics Conference; May 18, 2014.

(Continued)

*Primary Examiner* — Alex Torres-Rivera
(74) *Attorney, Agent, or Firm* — The Mueller Law Office, P.C.

(57) ABSTRACT

The combined voltage regulator and snubber circuit generally has a voltage regulator device in parallel with the energy storage element of the snubber circuit operatively connectable in series with a leakage inductance current path; the leakage inductance being part of a magnetic component utilized in a switch-mode power supply having an input voltage source, controllable semiconductor switches, freewheeling semiconductor switches, feedback controller, reactive energy storage components and a load; the voltage regulator generally providing constant or variable voltage to the gate driver of the controllable semiconductor and/or feedback controller; the snubber circuit generally recycling leakage inductance energy to the input capacitor of a neighboring cell in a multi-cell stacked converter.

18 Claims, 10 Drawing Sheets

(56) References Cited

U.S. PATENT DOCUMENTS

| | | | |
|---|---|---|---|
| 2012/0106204 A1* | 5/2012 | Imanishi | H02M 3/1584 363/16 |
| 2014/0232270 A1 | 8/2014 | Kimura | |
| 2015/0085534 A1* | 3/2015 | Abramovitz | H02M 1/34 363/21.01 |
| 2015/0171757 A1* | 6/2015 | Jin | H02M 3/33507 363/21.02 |
| 2015/0280580 A1* | 10/2015 | Chen | H02M 3/33507 307/17 |
| 2016/0226389 A1 | 8/2016 | Quaglino | |

OTHER PUBLICATIONS

Ahsanuzzaman, High Density Power Management Architecture for Portable Applications, Graduate Department of Electrical and Computer Engineering, University of Toronto, 2015.
International Search Report and Written Opinion dated Oct. 24, 2017 for PCT Patent Application No. PCT/CA2017/050850.
Radic et al., Minimum-Deviation Digital Controller IC for DC-DC Switch-Mode Power Supplies, IEEE Transactions on Power Electronics, vol. 28, No. 9, pp. 4281-4298, Sep. 2013.

* cited by examiner

LOSSLESS SNUBBER CIRCUITS

FIELD OF THE INVENTION

The present invention relates generally to the field of switch-mode power supplies, and more particularly to the field of voltage snubbers and auxiliary power supplies.

BACKGROUND OF THE INVENTION

Switch-mode power supplies (SMPS) are power management components in modern electronic devices. They provide, among other things, power efficient and galvanically isolated power to multiple loads. In order to achieve high power processing efficiency and/or galvanic isolation, conventionally one or more magnetically coupled elements, semiconductor switches and associated gate driver circuits are required.

The magnetically coupled elements often suffer from non-trivial leakage inductance phenomena, which necessitate the need for affordable voltage snubber circuits in order to control the semiconductor switch peak drain-to-source voltages. As a result of the price sensitive nature of SMPS, the snubber circuits are typically limited to the cost-effective passive and power lossy resistor-capacitor-diode (RCD) configurations.

In systems sensitive to power losses and heat generation, the dissipation in lossy components in the form of heat is unsuitable. Recycling of energy within the system provides an opportunity for system form-factor reduction and power efficiency improvement.

Clamping the maximum drain source voltage of switching power transistors allows for increased device reliability and use of power transistors with improved figure-of-merit (FOM). The improved FOM enables the SMPS to operate at higher switching frequency while maintaining high power processing efficiency. Furthermore, it allows for a reduction of the SMPS reactive component size and cost.

Conventional auxiliary power supplies required to operate the gate drivers are not well suited for modern multiple-switch high voltage floating and/or high-side applications, due to their complexity, low power processing efficiency and/or high cost. There remains room for improvement at the system and circuit level.

SUMMARY OF THE INVENTION

According to one embodiment of the invention, there is provided a snubber circuit that may comprise a single-quadrant switch, energy storage device, and a voltage regulator connected in series with a leakage inductance current path of the SMPS.

The single-quadrant switch is provided in the form of a Schottky diode, Si diode, SiC diode or similar device; the energy storage device is provided in the form of a discrete capacitor, parasitic capacitor or similar device; the voltage regulator is provided in the form of a shunt voltage regulator, series voltage regulator, miniature SMPS, low-dropout regulator, switched-capacitor converter or similar device.

The single-quadrant switch is connected in series with the energy storage element, while the voltage regulator is connected in parallel with the energy storage element. The voltage regulator output voltage rail is connected to a load provided in the form of a floating semiconductor switch gate driver, control circuit or similar device. In such a way, the embodiment provides an alternative path for the SMPS leakage inductance current to commute through the series single-quadrant switch and energy storage element. The embodiment also provides a method for the stored leakage energy to be recycled instead of dissipated, via the regulated output voltage rail of the voltage regulator. As a result, the semiconductor switch drain-to-source peak voltage is minimized during switching transients and the power losses of the voltage regulator and gate driver reduced.

In accordance with one aspect, there is provided a voltage regulator circuit for further reducing the gate driver and snubber losses, having variable output voltage relative to the SMPS output power. The voltage regulator circuit dynamically reduces its output voltage value during low output power levels. As a result, the gate driver losses are reduced improving the SMPS power processing efficiency during SMPS low-to-medium output power level states of operation.

In one embodiment, Zener diodes are used to dissipate stored energy and protect the power switches of the SMPS. The voltage across the power switches are clamped increasing device reliability and also allowing for the use of higher switching frequency and smaller reactive components.

In another embodiment, the energy stored in the leakage inductance of one cell is transferred to the input capacitor of a neighbouring cell, leading to improved efficiency and reduced heat dissipation.

According to another aspect of the invention, there is provided a switch-mode power supply with a converter cell, the converter cell may comprise: an input capacitor; a snubber circuit comprising an energy storage device and a reverse-biased diode connected in series therewith; a transformer in parallel with the snubber circuit; the transformer having load output; a switch driven by a gate driver and controlling the current through the transformer; and a voltage regulator having an input and a regulated output; the regulated output of the voltage regulator connects to the voltage rails of a gate driver; the input of the voltage regulator connects in parallel across the snubber circuit. For additional converter cells, the input of the voltage regulator of each additional converter cell may connect in parallel to the transformer of a prior converter cell. The final converter cell may have the snubber circuit comprises a resistive element in parallel with the energy storage device.

According to yet another aspect of the invention, there is provided a switch-mode power supply comprising a plurality of converter cells connected in parallel with respect to a voltage input and a load, each converter cell comprising: an input capacitor across the input of the converter cell; a snubber circuit comprising an energy storage device and a reverse-biased diode connected in series therewith; a transformer in parallel with the snubber circuit; the transformer having load output; a switch driven by a gate driver and controlling the current through the transformer; and a voltage regulator having an input and a regulated output; the regulated output of the voltage regulator connects to the voltage rails of a gate driver; wherein the input of the voltage regulator for each converter cell connects across the transformer of a prior converter cell; and wherein the input of the voltage regulator for the last converter cell connects in parallel across the snubber circuit for the last converter cell. The snubber circuit of the first converter cell may comprise a resistive element in parallel with the energy storage device. The energy storage component may comprise a capacitor. A load may be connected to the load output of the transformer. A feedback controller may monitor the load output of the transformer in comparison to a reference voltage. The feedback controller may comprise a subtraction block, a compensator, and a multiple-output pulse-width modulator (MPWM) generator controlling the gate driver of each converter cell.

According to any aspect of the invention, the energy storage component may comprise a capacitor. A load may be connected to the load output of the transformer. A feedback controller may monitor the load output of the transformer in comparison to a reference voltage. The feedback controller may comprise a subtraction block, a compensator, and a multiple-output pulse-width modulator (MPWM) generator controlling the gate driver of each converter cell.

According to any aspect of the invention, the voltage regulator may be selected from: a switch-mode power supply, linear dropout regulator, switched-capacitor converter, shunt voltage regulator, and series voltage regulator. The voltage regulator may comprise: a voltage blocking device, connecting the input and regulated output; a feedback control circuit, connecting the input port and a control port of the voltage blocking device; and a voltage reference circuit, connecting the voltage blocking device and the relative zero potential point. The voltage blocking device comprises a NPN BJT semiconductor transistor; the feedback control circuit is selected from at least one of a resistor, a semiconductor transistor, and/or a combination thereof; and the voltage reference circuit is a combination of a current independent and current dependant voltage reference. The current independent voltage reference is selected from at least one of a Zener diode and forward biased diode; and the current dependent voltage reference is selected from at least one of a resistor, a thermistor, and/or a combination thereof.

In yet another aspect of the invention, there is provided a method of improving an power efficiency of a switched-mode power supply without compromising a maximum drain-source blocking voltage of power semiconductor switches, the method comprising: during low-input voltage conditions, recycling leakage inductance energy using a low-loss snubber diode to transfer the leakage inductance energy from one converter cell to an input capacitor of a neighbouring cell and clamping a drain-source voltage of power semiconductor switches; and during high-input voltage conditions, recycling the leakage inductance energy by providing a series path for a leakage inductance current from a transformer to a voltage regulator of the neighbouring cell and clamping the drain-source voltage of a power semiconductor blocking voltage.

Many further features and combinations thereof concerning the present improvements will be apparent to those skilled in the art following a reading of the instant disclosure.

BRIEF DESCRIPTION OF THE DRAWINGS

An embodiment will now be described, by way of example only, with reference to the attached Figures, wherein.

These drawings depict exemplary embodiments for illustrative purposes and variations, alternative configurations, alternative components and modifications may be made to these exemplary embodiments.

DETAILED DESCRIPTION OF THE EMBODIMENT

Figure 1:
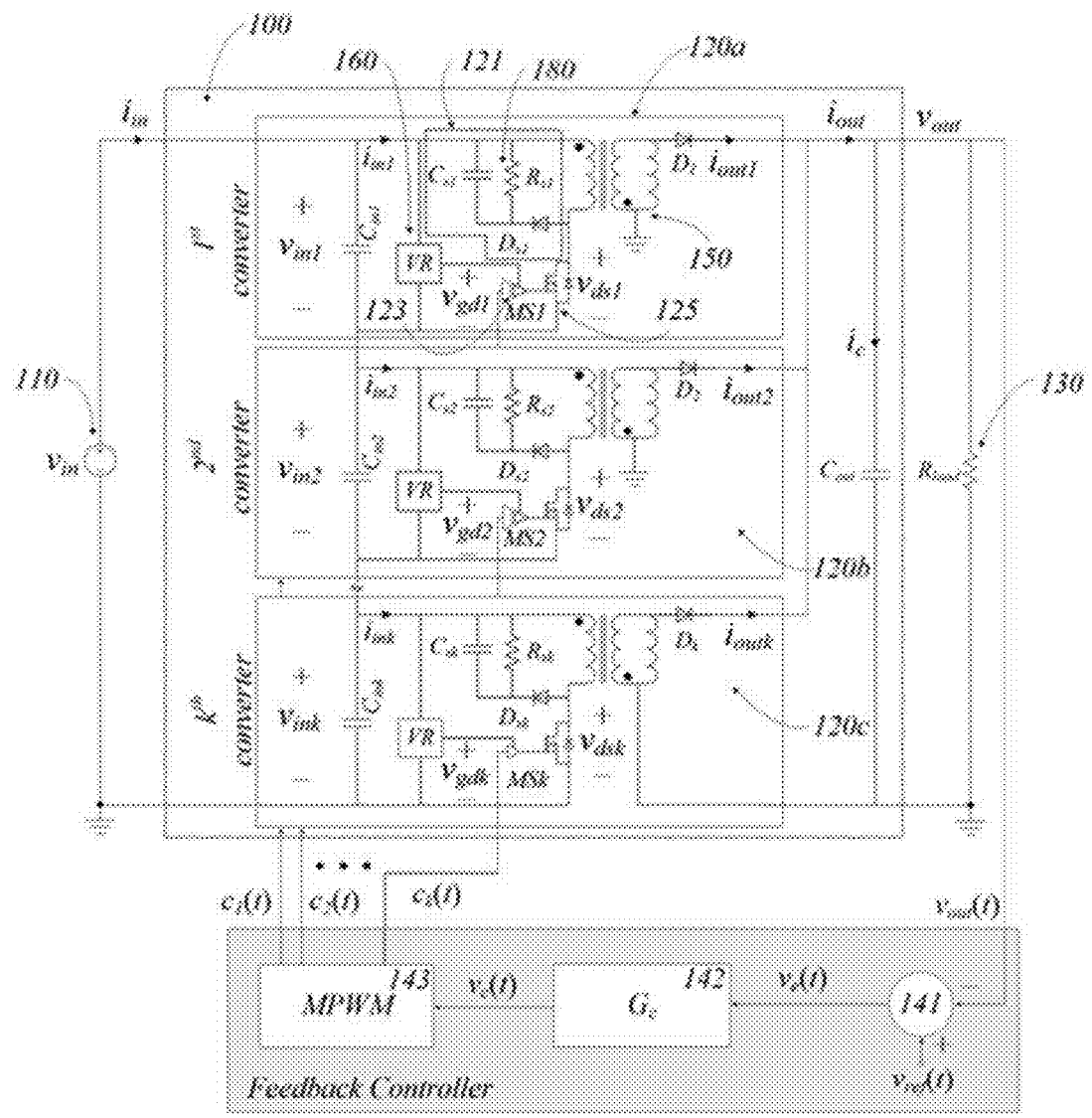
FIG. 1 is a schematic diagram of a stacked flyback converter utilizing RCD snubbers and voltage regulators powered by cell input capacitors.

FIG. 1 shows an example of a stacked flyback converter 100, in accordance with the prior art. As depicted, the stacked flyback converter 100 has a direct current (DC) voltage source 110, with input voltage Vin, connected to the primary side of a string of serially connected flyback converter cells 120 (also known as 120a, 120b, and 120c). Each primary side flyback converter cell 120 comprises an RCD snubber 121 (having an energy storage device and a resistive element (e.g. resistor) pair 180), voltage regulator (VR) 160, gate driver (gd) 123, transformer 150 and semiconductor switch 125. The secondary side ports of the stacked flyback converter are, in turn, connected in parallel to an output load 130 providing an output voltage Vout. The output voltage is sensed and compared to a reference voltage Vref by a subtraction block 141. The voltage difference is then processed by a gain compensator 142, in order to calculate a control signal Vc. The control signal is passed to a multiple-output pulse-width modulator (MPWM) 143 which generates an equivalent SMPS switch on-off control actions.

Figure 2:
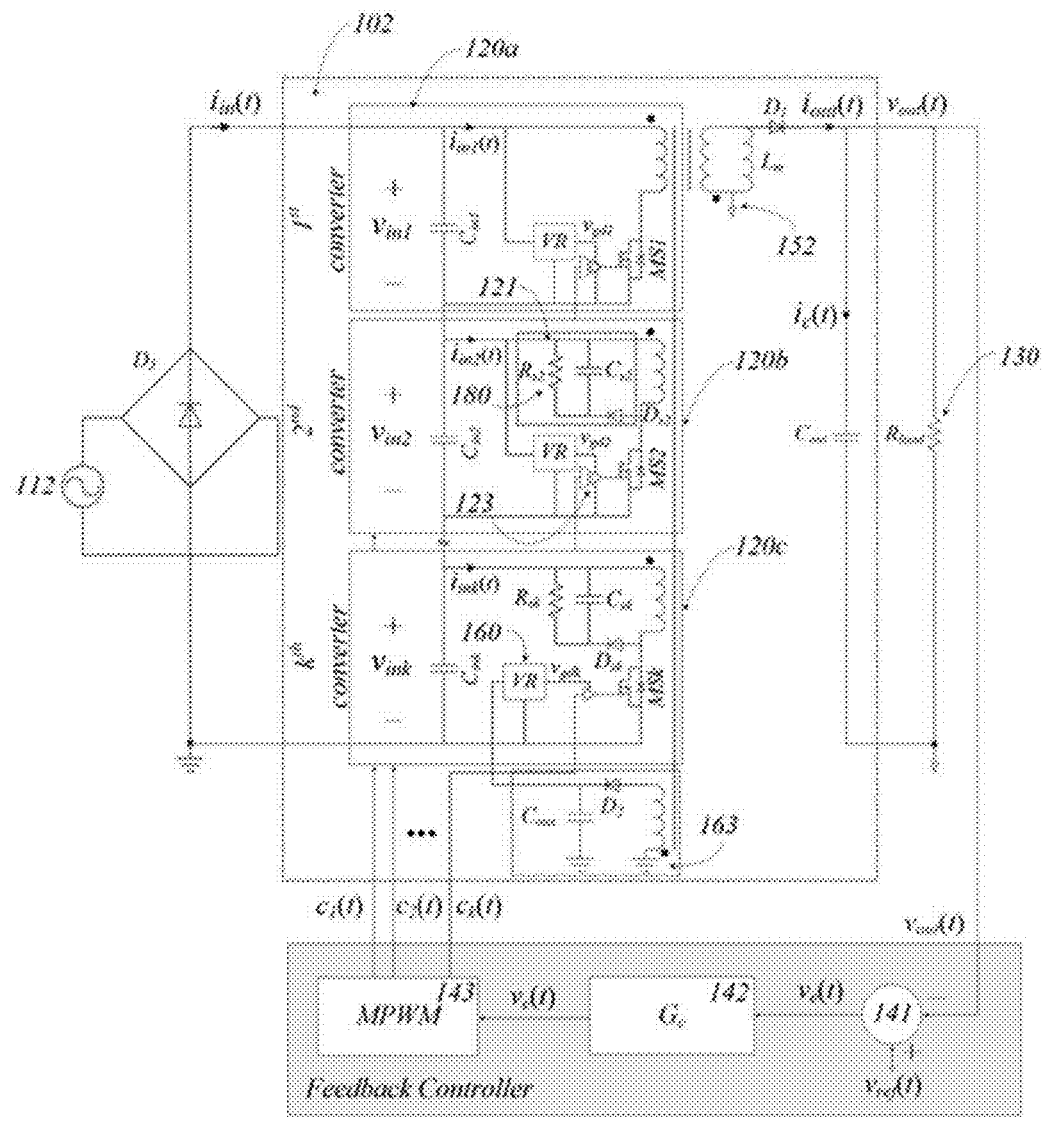
FIG. 2 is a schematic diagram of a multi-winding flyback converter utilizing RCD snubbers, cell input voltage connected and auxiliary winding connected voltage regulators.

FIG. 2 is another example of the multi-winding flyback converter 102 for converting alternating current (AC) to DC. As shown, the multi-winding flyback converter 102 has the voltage source 112 which is adapted, in this example, to provide AC. Furthermore, the individual converter cell two-winding transformers 150, as described with reference to FIG. 1, are adapted into a single multi-winding transformer 152. The bottom converter cell 120c voltage regulator 160 is adapted to receive a voltage from an auxiliary winding, diode and capacitor circuit 163. The top converter cell 120a is adapted to utilize the voltage RCD snubbers 121 of neighbouring converter cells 120.

Figure 3:
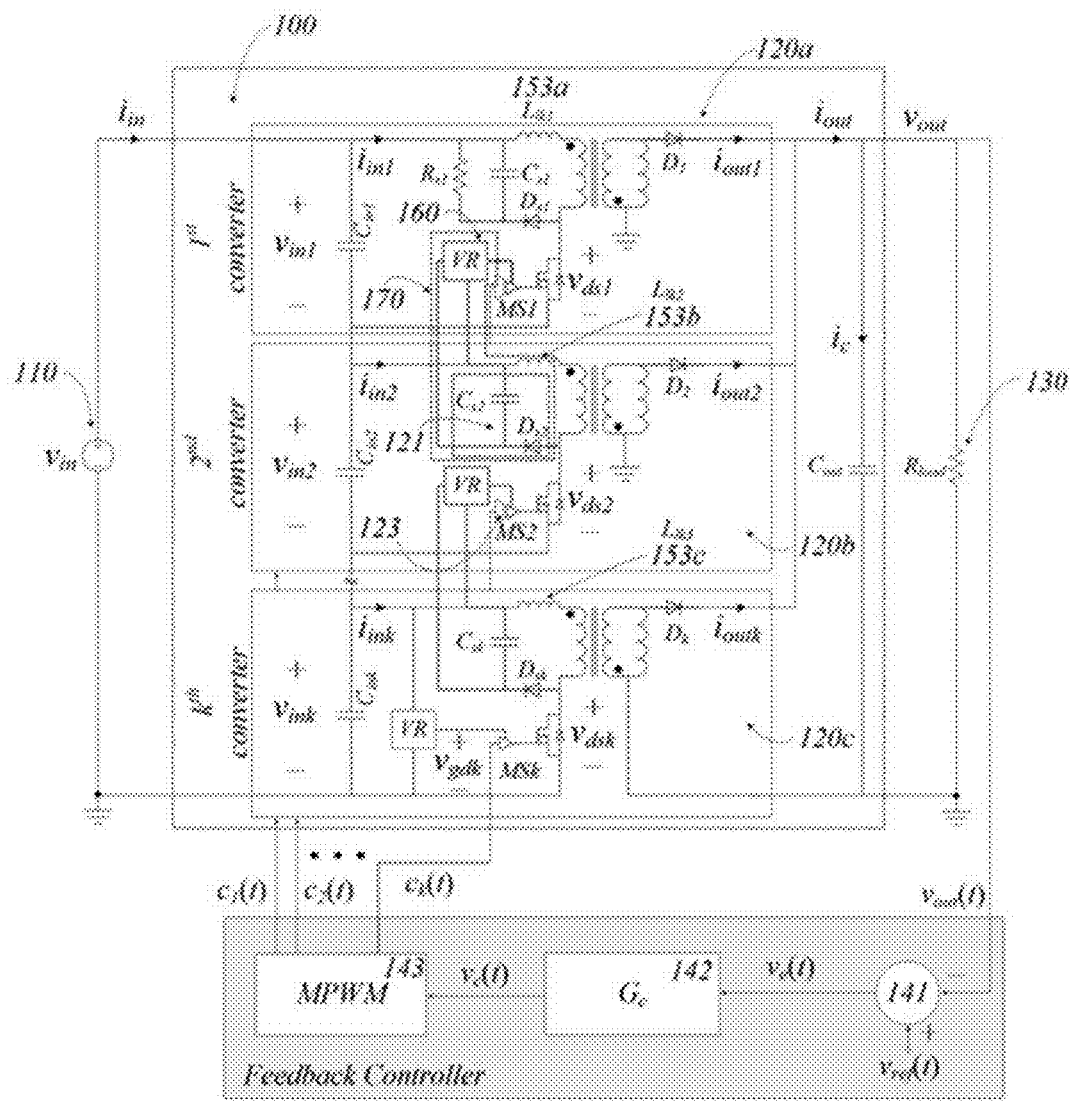
FIG. 3 is a schematic diagram of a stacked flyback converter with combined snubber and voltage regulator circuit, in accordance with an embodiment.

FIG. 3 is an example of the stacked flyback converter 100, in accordance with an example embodiment. As shown, the top stacked flyback converter cells 120a and 120b are adapted to utilize the combined snubber and voltage regulator circuit 170. Each converter cell has an input capacitor, $C_{in1}$ to $C_{ink}$, in parallel with a combined snubber and voltage regulator circuit 170. The snubber circuit 170 is also placed in parallel with the transformer primary side leakage inductance 153a and 153b current paths. A gate driver, MS1 to MSk, drives a semiconductor switch 125 controlling the current through the transformer 153a and 153b. A reverse-biased snubber diode $D_{s1}$ to $D_{sk}$ prevents forward flowing current from passing through the resistive element (e.g. resistor), $R_{s1}$. The voltage regulator inputs are connected in parallel to the snubber circuit 170 of the next flyback converter cell (e.g. for cell 120a, the voltage regulator 160 inputs are connected in parallel to the snubber circuit for cell 120b). The voltage regulator 160 output voltage ports are connected to the voltage rails of the gate driver 123. In subsequent flyback converter cells, 120b, the resistive element $R_{s1}$ of the snubber circuit 170 is not present. In its place is the voltage regulator of the prior converter cell. The final cell, in this embodiment 120c, connects its voltage regulator across the input of the cell 120c as it is the last cell in the chain of cells 120a, 120b, and 120c.

Similar to the prior art power supply, the output voltage is sensed and compared to a reference voltage Vref by a subtraction block 141. The voltage difference is then processed by a compensator 142, in order to calculate a control signal Vc. The control signal is passed to a multiple-output pulse-width modulator (MPWM) 143 which generates an equivalent SMPS switch on-off control actions for the gate drivers MS1 to MSk.

Figure 4:
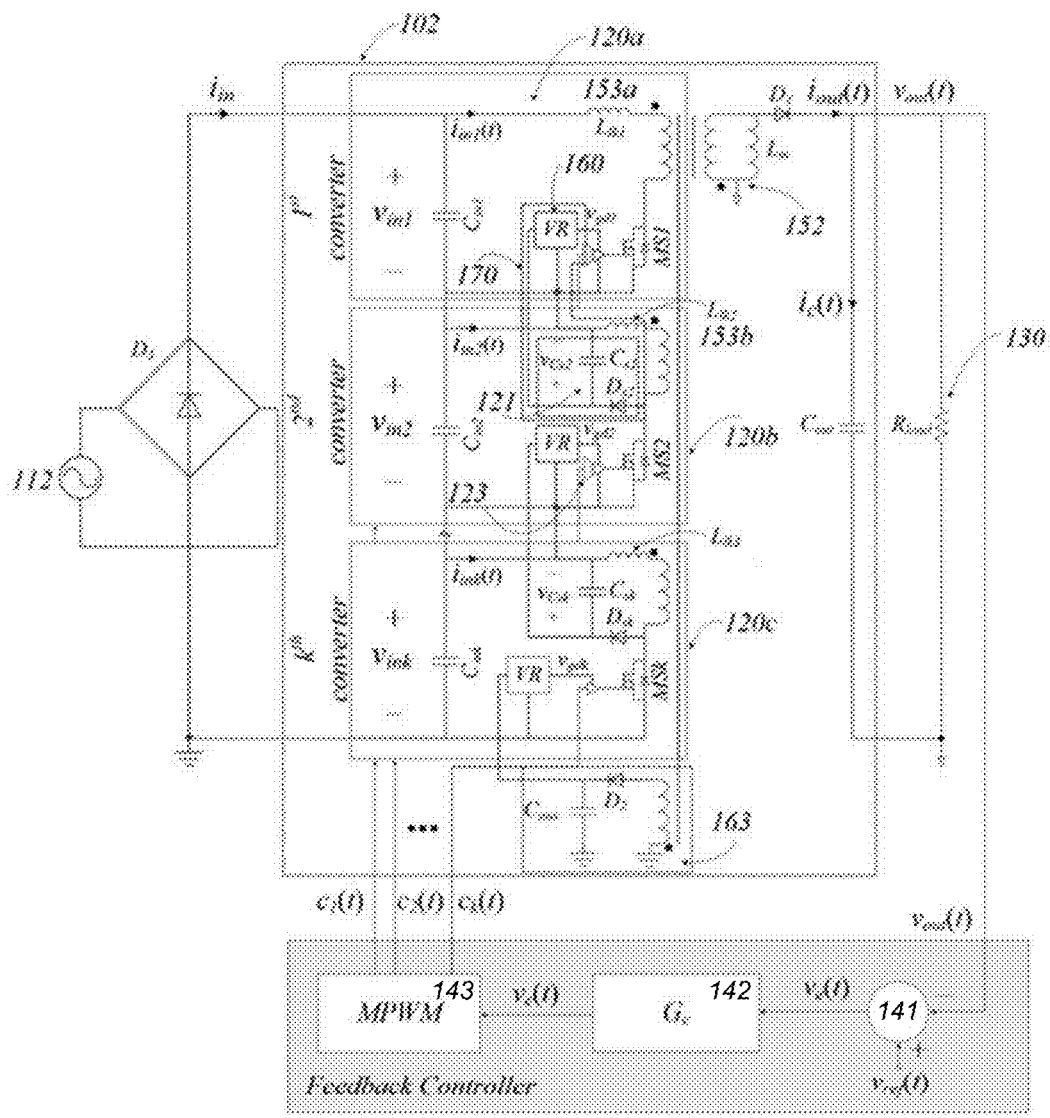
FIG. 4 is a schematic diagram of a multi-winding flyback converter with combined snubber and voltage regulator circuit, in accordance with an embodiment.

FIG. 4 is another example of the proposed multi-winding flyback converter 102, in accordance with an embodiment. As shown, the top multi-winding flyback converter cells 120a and 120b are adapted to utilize the combined snubber and voltage regulator circuits 170. The snubber and voltage regulator circuits 170 are placed in parallel with the transformer primary side leakage inductance 153a and 153b current paths. In addition, the voltage regulator output voltage ports are connected to the gate driver 123 voltage rails.

The voltage regulator 160 recycles the transformer leakage energy via the voltage snubber 121. As a result, compared to the prior art configuration, the gate driver 123 losses are completely eliminated. Furthermore, for large input voltage applications the voltage regulator 160 peak input voltage is reduced significantly, enabling for the miniaturization, cost optimization, and power loss reduction of the voltage regulator 160.

The voltage regulator and gate driver circuit 170 reduces the voltage snubber 121 power losses during low-to-medium output power loads. The power loss reduction is due to the variable effective resistance of the voltage regulator 160 and gate driver 123 combinations which draws less power from the voltage snubber capacitor, than prior art resistance RCD snubber 121 solutions, at lower power levels. At the highest output power load level the effective resistance is the same for both the present embodiment and the prior art solution. Therefore, the voltage snubber losses, voltage snubber capacitor voltage and peak semiconductor 125 drain-to-source voltage are the same at this power level only.

The embodiment allows for further reduction of the snubber losses during low output power load levels when a variable voltage regulator is utilized as described further below. By allowing the output voltage of the voltage regulator to track the snubber capacitor (which is smaller during low-load operation), the effective power consumption of the gate drivers can be reduced further. In such a way, the dominant gate driver power losses can be significantly reduced during SMPS low-to-medium output power load operating conditions contributing to higher overall SMPS power processing efficiency. Further details of one such variable series voltage regulator are provided below with reference to FIG. 5.

Figure 5:
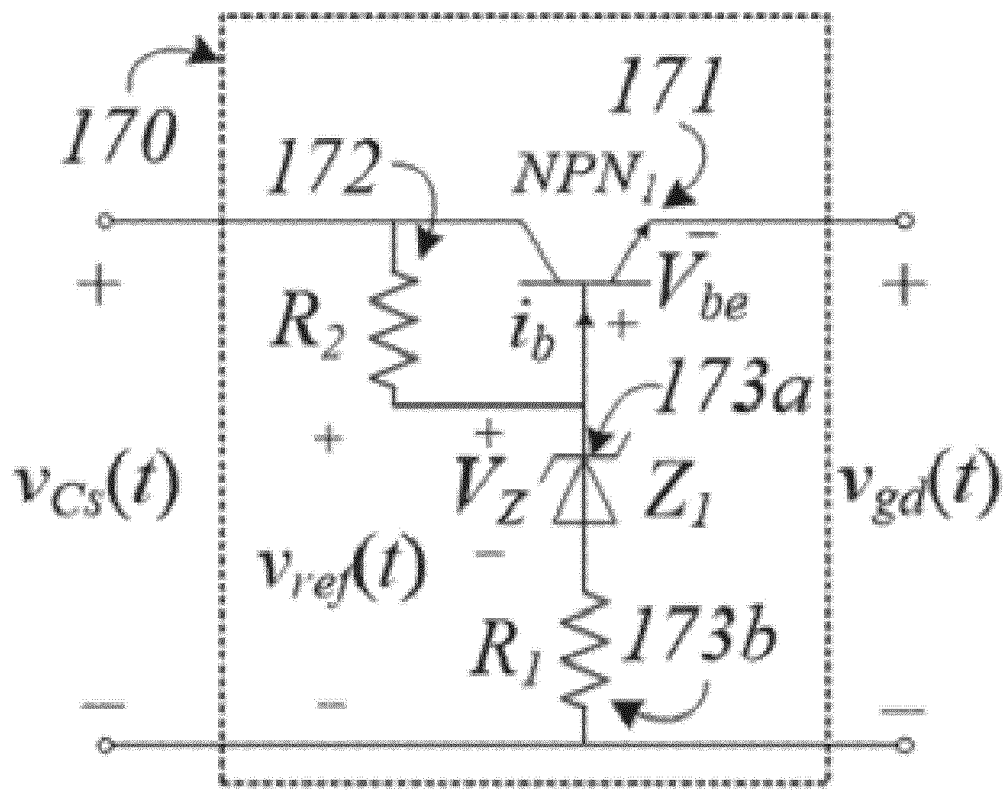
FIG. 5 is a series voltage regulator with input voltage dependent output voltage regulation, in accordance with an embodiment.

FIG. 5 shows an example of a variable series voltage regulator 170, in accordance with an embodiment. As depicted, the variable series voltage regulator 170 has a NPN bi-polar junction transistor (BJT) 171 between the input and output port, a feedback resistor 172 connected between the input port and the base gate of the BJT, and a voltage reference circuit 173 composed of a current independent (Zener diode) 173a and current dependent components (e.g. resistor) 173b.

Figures 6A, 6B:
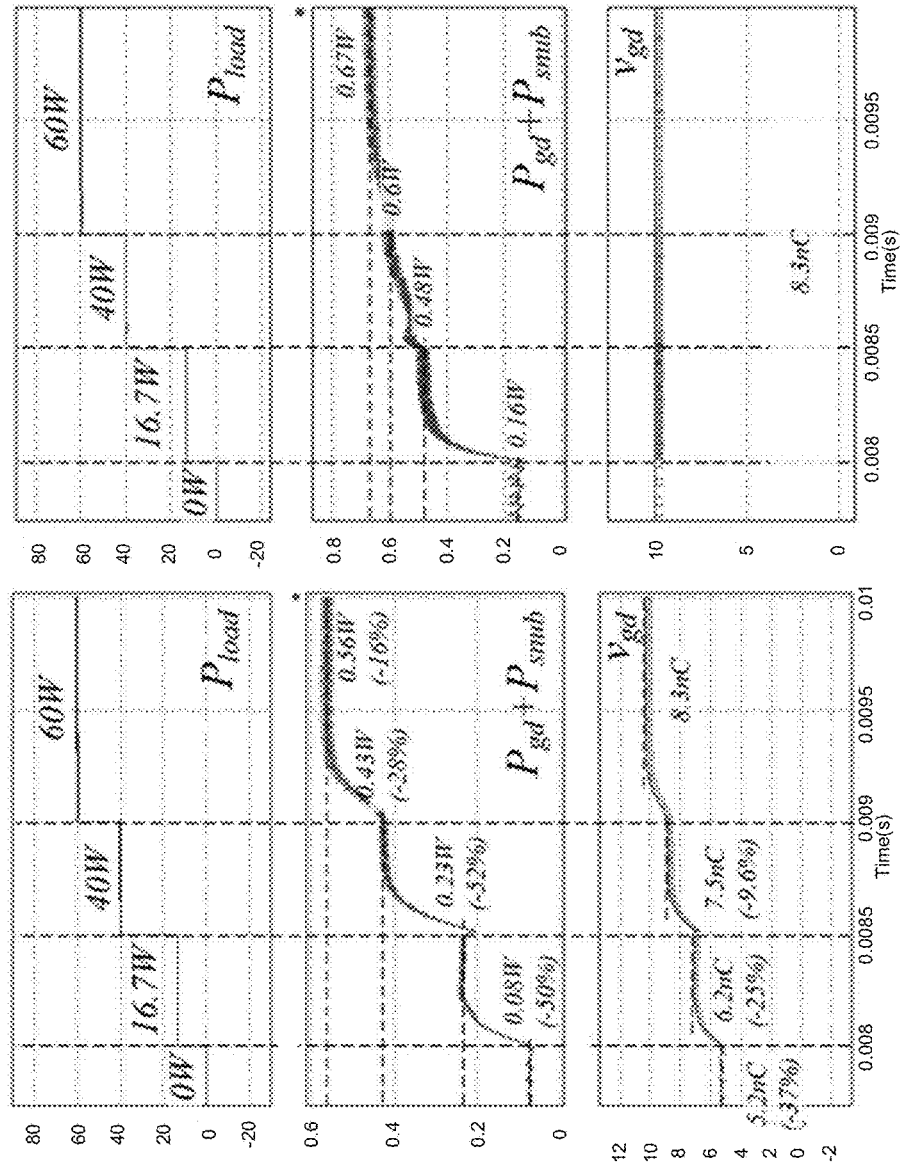
FIGS. 6A and 6B are graphs for an example embodiment and the prior art respectively showing the progression of the combined gate driver (gd) and snubber (snub) power losses, primary side semiconductor switch gate driver voltages, and primary side gate charge as a function time and output load power level for a simulated multi-winding flyback converter from FIG. 4.

The combined gate driver and snubber losses of a simulated multi-winding flyback converter 102 (averaged per cell) with the embodiment (left) and without the embodiment (right) are shown in FIG. 6. It can be seen that a 17 to 50% reduction of the power losses over the prior art is achieved with the use of the embodiment.

Figure 7:
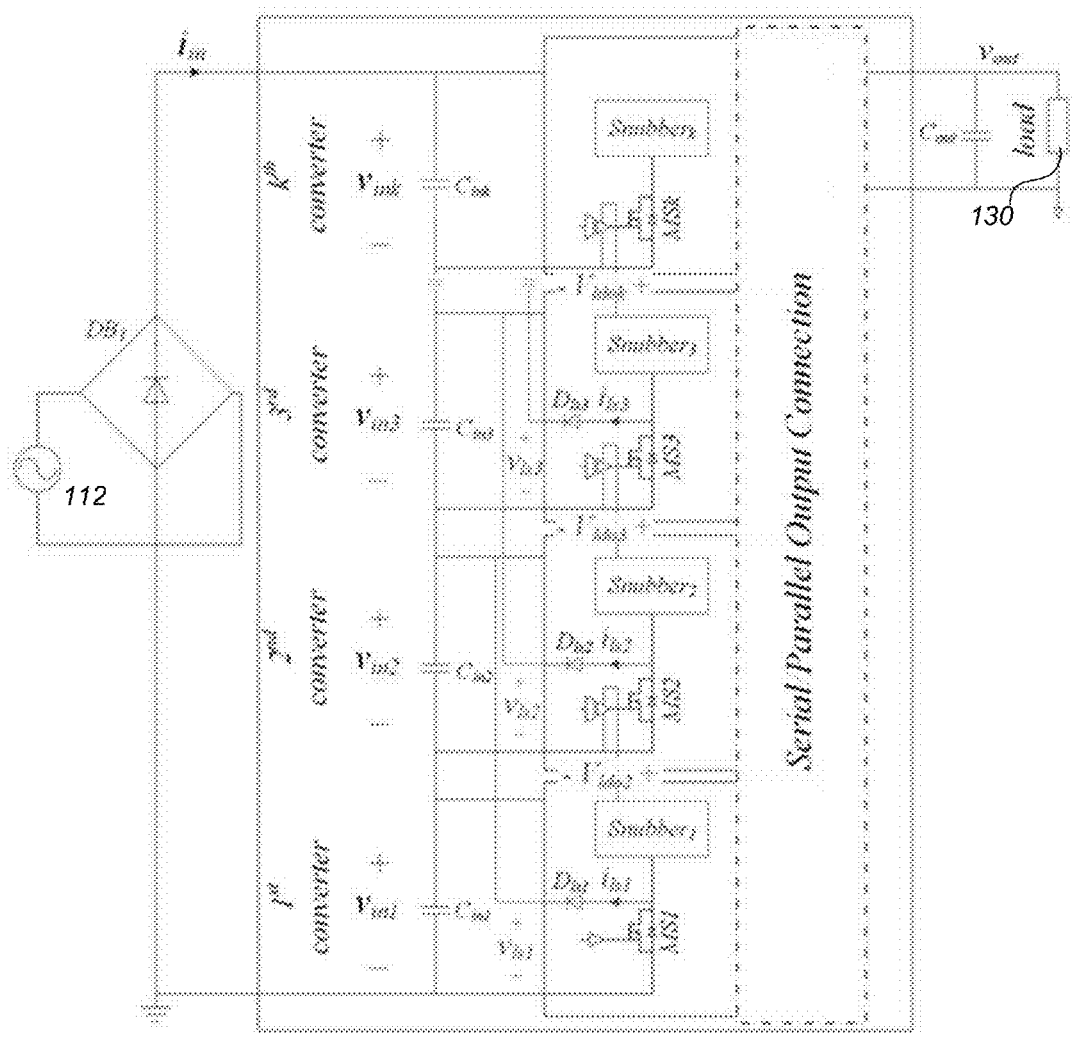
FIG. 7 is a schematic diagram of a multiple cell stacked converter, wherein the input voltage is partitioned via a capacitor string, and the excess energy stored in the leakage inductance of one cell is recycled into the input capacitor and gate drive circuitry of its neighbouring cell.
Figure 8:
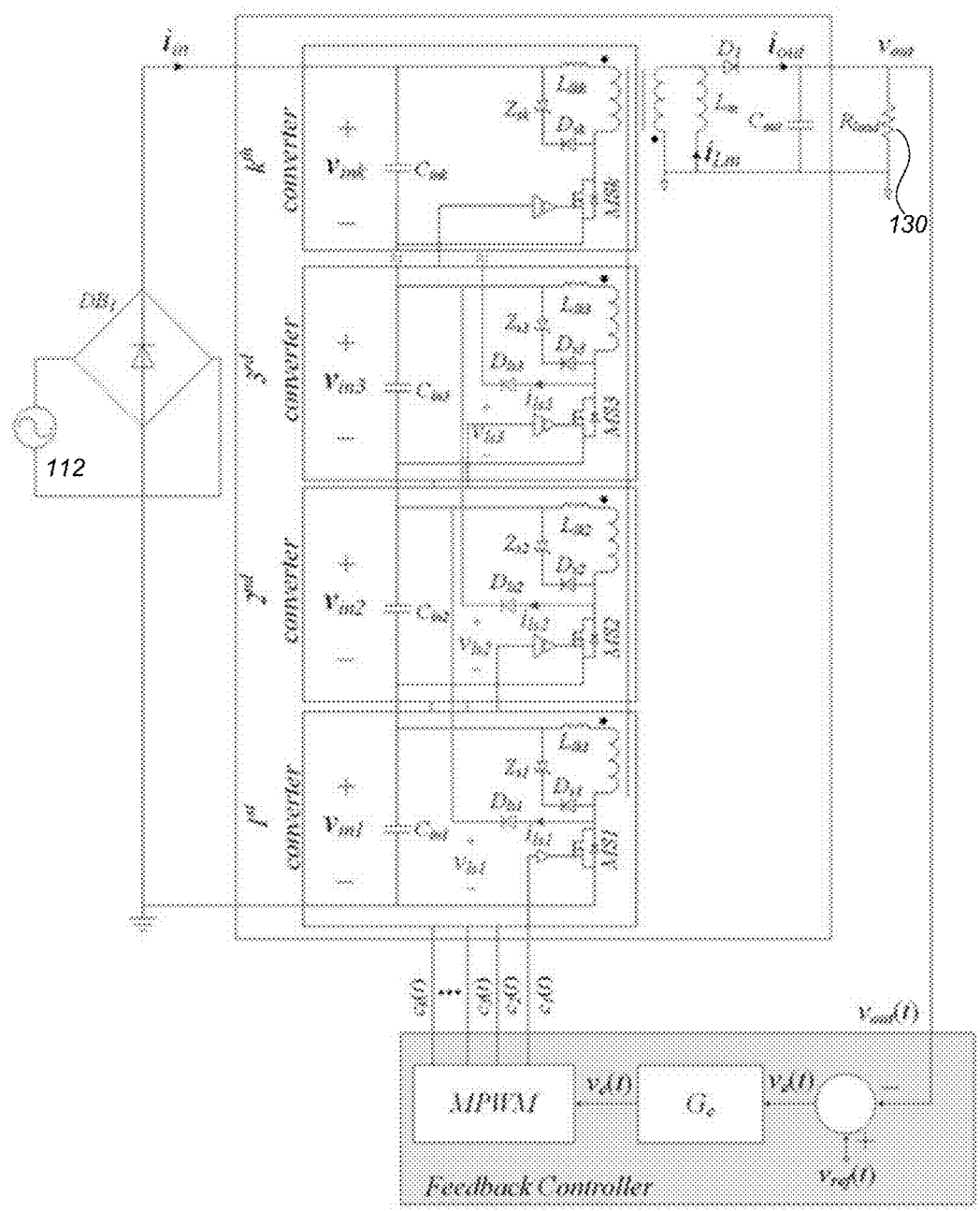
FIG. 8 is schematic diagram of a multi-winding flyback converter utilizing a snubber diode delivering charge to the input capacitor of its neighbouring cell, and a Zener diode which is used to clamp voltage across a power switch.
Figure 9:
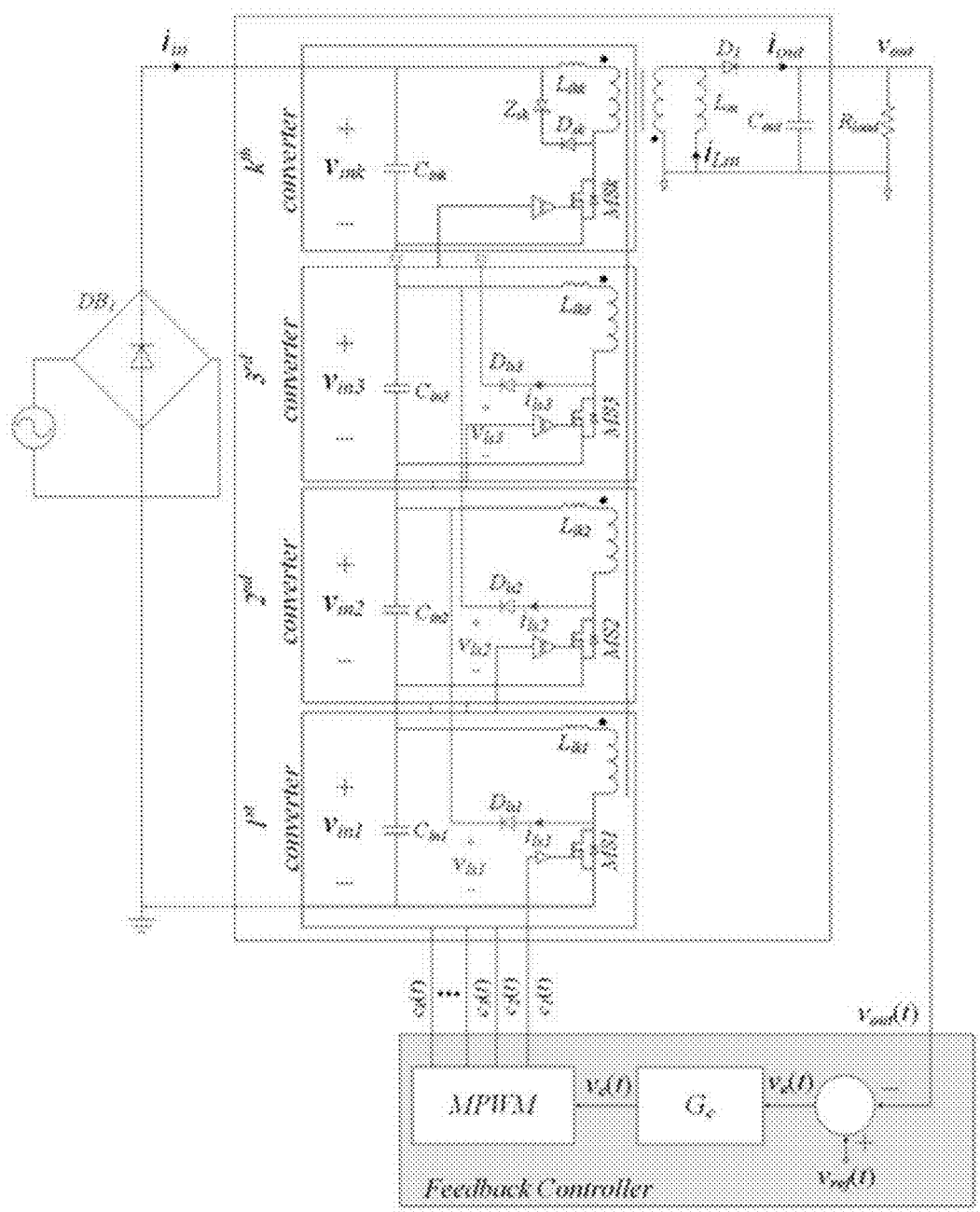
FIG. 9 is a schematic diagram of a multi-winding flyback converter utilizing a snubber diode delivering charge to the input capacitor of its neighbouring cell.
Figure 10:
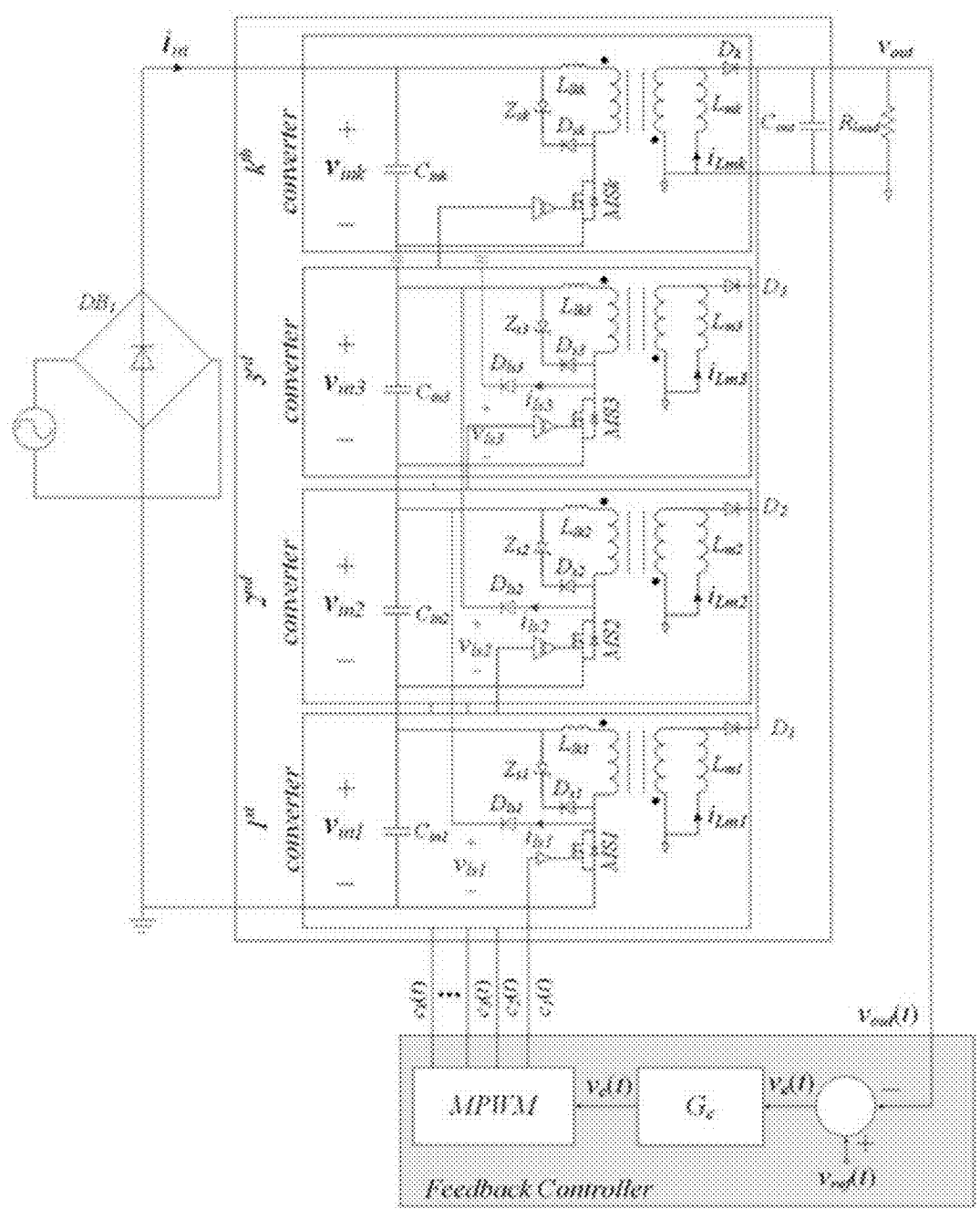
FIG. 10 is schematic diagram of a stacked flyback converter utilizing a snubber diode delivering charge to the input capacitor of its neighbouring cell, and a Zener diode which is used to clamp voltage across a power switch.
Figure 11:
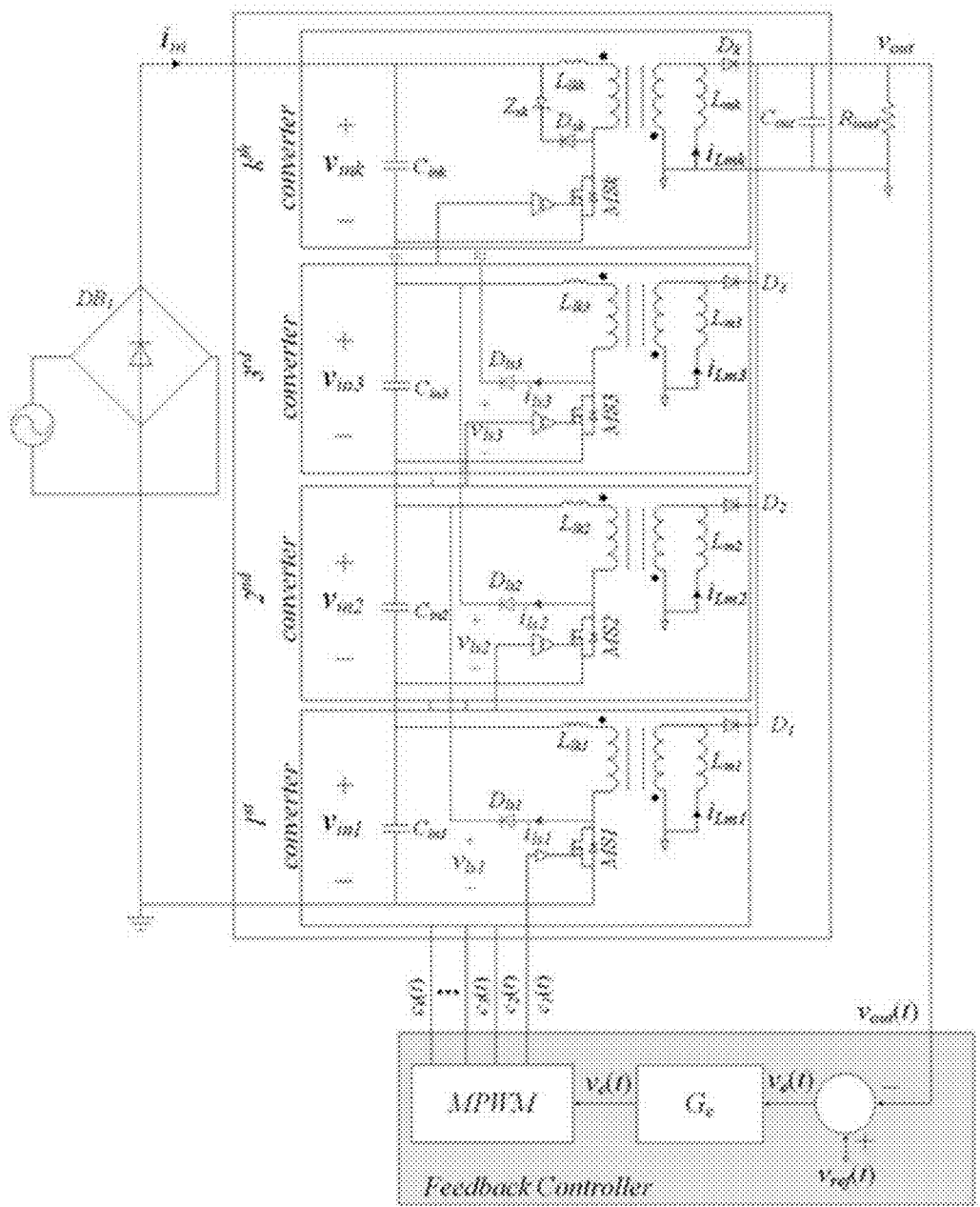
FIG. 11 is a schematic diagram of a stacked flyback converter utilizing a snubber diode delivering charge to the input capacitor of its neighbouring cell.

FIG. 7 shows a generalized multiple cell stacked converter, wherein the input voltage 112 is partitioned via a capacitor string of input capacitors, $C_{in1}$ to $C_{ink}$, and the excess energy stored in the leakage inductance of one cell is recycled into the input capacitor and gate drive MS1 to MSk circuitry of its neighboring cell. A generalized multi-winding flyback converter is depicted in FIG. 8, where a combination of a Zener diode $Z_{s1}$ to $Z_{sk}$ for power switch device protection and snubber energy recycling to a neighboring cell allows for universal operation across a range of input voltages 112. Similarly, FIG. 9 is another embodiment of recycling leakage inductance energy in multi-winding flyback converters having a lower input voltage by removing the Zener diodes from all but the last converter. Additional embodiments of this structure for a stacked flyback are shown in FIG. 10 and FIG. 11, for universal operation and lower voltage operation, respectively.

Further aspects of the embodiments herein may be a combined voltage regulator and snubber circuit comprising: i. a snubber device, providing a series path for leakage inductance current, and; ii. a voltage regulator device, whose input is connected in parallel with the energy storage component of the snubber device.

Another aspect of the embodiments described herein may be a multi-winding or multi-cell parallel-input parallel/serial-output converter wherein the input voltage is partitioned among multiple stages and the leakage inductance energy of one stage is used to deliver power to the gate driver IC and any other auxiliary circuits of its neighbouring stage. The multi-winding or multi-cell parallel-input parallel/serial-output converter may have a low-loss snubber diode transfers energy from the leakage inductance of one stage to the input capacitor of its neighbouring stage. The voltage regulator and snubber of circuit may be used to transfer the leakage inductance energy from one stage to the gate-driver of its neighbouring stage.

According to yet another aspect of the embodiments herein, there is provided the the snubber device may be comprise a single-quadrant switch and an energy storage device, such as a series diode and capacitor circuit, respectively.

The voltage regulator described herein may be a switch-mode power supply, linear dropout regulator, switched-capacitor converter, shunt voltage regulator or series voltage regulator. The voltage regulator may comprise i. a voltage blocking device, connecting the input and output ports; ii. a feedback control circuit, connecting the input port and the control port of the voltage blocking device, and; iii. a voltage reference circuit, connecting the voltage blocking device port and the relative zero potential point. The voltage blocking device may be an NPN BJT semiconductor transistor. The feedback control circuit may be a resistor, semiconductor transistor, or similar resistive element. The voltage reference circuit may be a combination of a current independent and current dependant voltage reference. The current independent voltage reference may be a Zener diode, forward biased diode, or similar device. The current dependent voltage reference may be a resistor, thermistor, or similar device.

According to another aspect of the embodiments, the circuits described herein may permit a method that enables programmability of the maximum voltage of the snubber energy storage element, minimum voltage regulator output voltage and dynamic voltage regulator output voltage relative to the snubber energy storage element voltage.

Although particular embodiments describe a specific circuit architecture using individually, one of skill in the art may be able to combine the various circuits such that during low-input voltage conditions, one of the circuits may recycle the leakage inductance energy and clamps the drain-source voltage of the power semiconductor switches. In high-input voltage conditions, one of the circuits may recycle the leakage inductance energy and clamps the drain-source voltage of the power semiconductor blocking voltage. Through the combination of the various circuits described herein, the power processing efficiency over the entire mode of operation may be improved as a result without compromising the maximum drain-source blocking voltage of the power semiconductor switches.

As can be understood, the examples described above and illustrated are intended to be exemplary only. For instance, as may be readily understood by one skilled in the art, other embodiments of the voltage regulator can be constructed utilizing shunt voltage regulator, SMPS, low-dropout regulators, or switched capacitor converter devices. The scope is indicated by the appended claims.

What is claimed is:

1. A switch-mode power supply with a plurality of converter cells, the switch-mode power supply comprising:
    a voltage regulator of a first converter cell of the plurality of converter cells;
    a first gate driver of the first converter cell;
    an input capacitor of a second converter cell of the plurality of converter cells;
    a snubber circuit of the second converter cell, the snubber circuit comprising an energy storage device and a reverse-biased diode connected in series therewith;
    a transformer of the second converter cell in parallel with the snubber circuit; the transformer having a load output; and
    a switch of the second converter cell driven by a second gate driver of the second converter cell and controlling a current through the transformer;
    wherein:
        the voltage regulator has an input and a regulated output, the regulated output of the voltage regulator connected to voltage rails of the first gate driver, the input of the voltage regulator connected, in parallel, across the energy storage device of the snubber circuit.

2. The switch-mode power supply according to claim 1, further comprising:
    a second snubber circuit of a third converter cell, the second snubber circuit comprising a second energy storage device and a second reverse-biased diode connected in series therewith; and
    a second voltage regulator of the second converter cell having an input that connects, in parallel, to the second energy storage device of the second snubber circuit.

3. The switch-mode power supply according to claim 2, wherein a third snubber circuit of the first converter cell comprises a third energy storage device and a third reverse-biased diode connected in series therewith, a resistive element being connected in parallel with the third energy storage device.

4. The switch-mode power supply according to claim 1, wherein the energy storage device comprises a capacitor.

5. The switch-mode power supply according to claim 1, further comprising a load connected to the load output of the transformer.

6. The switch-mode power supply according to claim 1, further comprising a feedback controller configured to monitor the load output of the transformer in comparison to a reference voltage.

7. The switch-mode power supply according to claim 6, the feedback controller comprising a subtraction block, a compensator, and a multiple-output pulse-width modulator (MPWM) generator configured to control the first gate driver and the second gate driver.

8. The switch-mode power supply according to claim 1, wherein the voltage regulator is selected from: a switch-mode power supply, a linear dropout regulator, a switched-capacitor converter, a shunt voltage regulator, and a series voltage regulator.

9. The switch-mode power supply according to claim 1, wherein the voltage regulator comprises:
    a voltage blocking device, connecting the input of the voltage regulator and the regulated output of the voltage regulator;
    a feedback control circuit, connecting the input of the voltage regulator and a control port of the voltage blocking device; and
    a voltage reference circuit, connecting the voltage blocking device to a bias voltage.

10. The switch-mode power supply according to claim 9, wherein:
    the voltage blocking device comprises a NPN BJT semiconductor transistor;
    the feedback control circuit is selected from at least one of a resistor, and a semiconductor transistor; and
    the voltage reference circuit comprises a current independent voltage reference and a current dependent voltage reference.

11. The switch-mode power supply according to claim 10, wherein:
    the current independent voltage reference is selected from at least one of a Zener diode and a forward biased diode; and
    the current dependent voltage reference is selected from at least one of a resistor and a thermistor.

12. A switch-mode power supply comprising a plurality of converter cells connected in parallel with respect to a voltage input and a load, each converter cell comprising:
- an input capacitor across an input of the converter cell;
- a snubber circuit comprising an energy storage device and a reverse-biased diode connected in series therewith;
- a transformer in parallel with the snubber circuit, the transformer having a load output;
- a switch driven by a gate driver and controlling a current through the transformer; and
- a voltage regulator having an input and a regulated output, the regulated output of the voltage regulator connected to voltage rails of the gate driver;
- wherein the input of the voltage regulator of one or more first converter cells of the plurality of converter cells connects across the energy storage device of the snubber circuit of a neighbor converter cell; and
- wherein the input of the voltage regulator of a second converter cell of the plurality of converter cells connects to the snubber circuit of the second converter cell.

13. The switch-mode power supply according to claim 12, wherein the snubber circuit of a third converter cell of the plurality of converter cells comprises a resistive element in parallel with the energy storage device of that converter cell.

14. The switch-mode power supply according to claim 12, wherein each of the energy storage devices comprise a capacitor.

15. The switch-mode power supply according to claim 12, further comprising a load connected to the load output of the transformer.

16. The switch-mode power supply according to claim 12, further comprising a feedback controller monitoring the load output of the transformer in comparison to a reference voltage.

17. The switch-mode power supply according to claim 16, the feedback controller comprising a subtraction block, a compensator, and a multiple-output pulse-width modulator (MPWM) generator configured to control the respective gate driver of each converter cell of the plurality of converter cells.

18. The switch-mode power supply according to claim 12, wherein each of the voltage regulators comprise:
- a voltage blocking device, connecting the input of the voltage regulator and the regulated output of the voltage regulator;
- a feedback control circuit, connecting the input of the voltage regulator and a control port of the voltage blocking device; and
- a voltage reference circuit, connecting the voltage blocking device to a bias voltage.

* * * * *

UNITED STATES PATENT AND TRADEMARK OFFICE
CERTIFICATE OF CORRECTION

PATENT NO. : 10,135,344 B2  
APPLICATION NO. : 15/209184  
DATED : November 20, 2018  
INVENTOR(S) : Aleksandar Radic et al.

It is certified that error appears in the above-identified patent and that said Letters Patent is hereby corrected as shown below:

On the Title Page

Under abstract "18 Claims, 10 Drawing Sheets" should read --18 Claims, 11 Drawing Sheets--.

In the Drawings

FIG. 5 was omitted. Please add attached sheet.

Signed and Sealed this  
Fourth Day of June, 2019

Andrei Iancu  
*Director of the United States Patent and Trademark Office*